Figure 1:
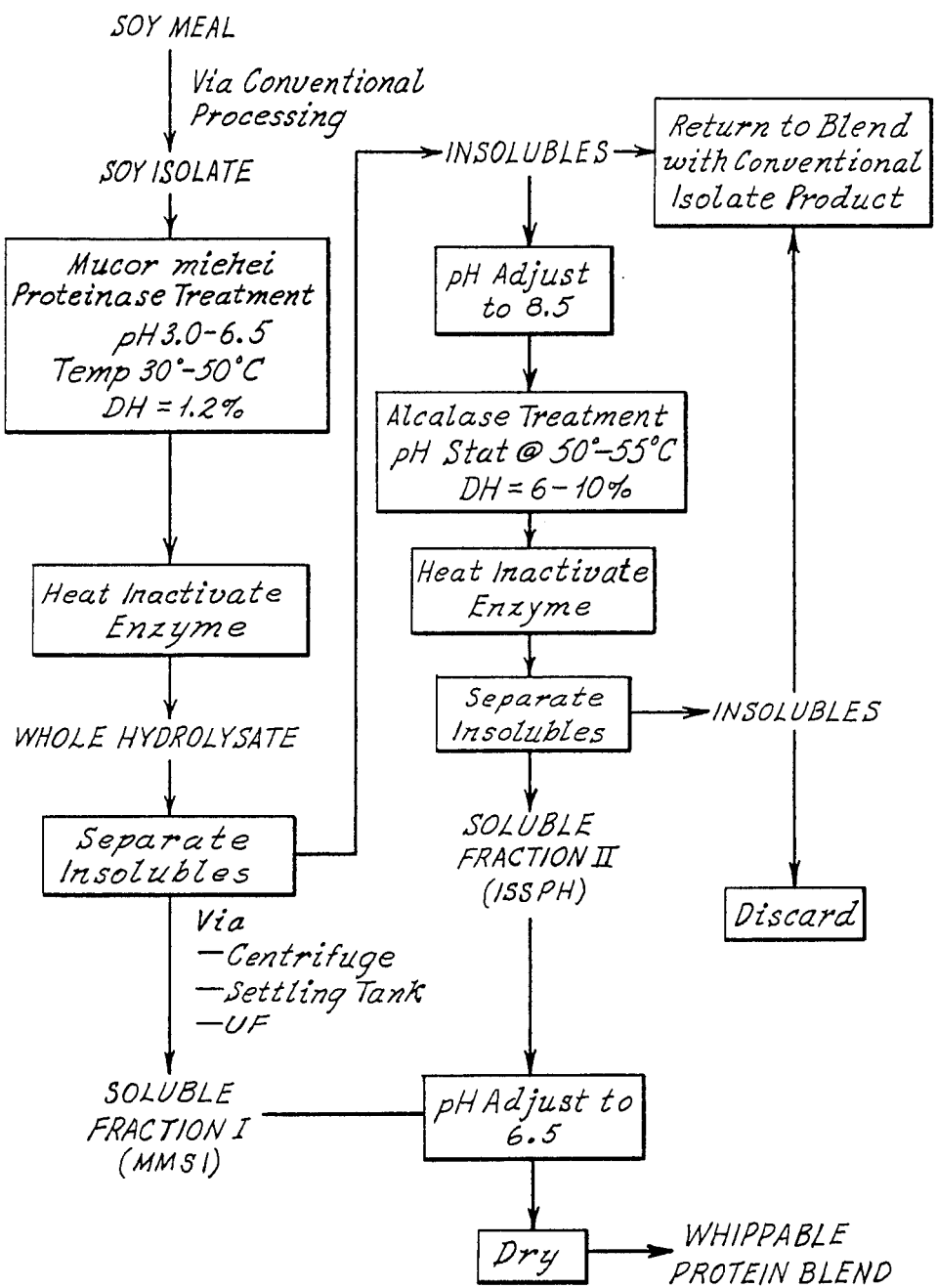

United States Patent [19]

Boyce et al.

[11] Patent Number: 4,632,903
[45] Date of Patent: Dec. 30, 1986

[54] ENZYME MODIFIED SOY PROTEIN FOR USE AS AN EGG WHITE SUBSTITUTE

[75] Inventors: Columbus O. L. Boyce, Brewster, N.Y.; Raymond P. Lanzilotta, Moss Beach, Calif.; Theodore M. Wong, Bethel, Conn.

[73] Assignee: Novo Laboratories, Inc., Wilton, Conn.

[21] Appl. No.: 687,171

[22] Filed: Dec. 28, 1984

[51] Int. Cl.$^4$ .......................... C12P 21/06; A23J 3/02
[52] U.S. Cl. ...................................... 435/69; 435/267; 426/46; 426/656
[58] Field of Search .................... 426/46, 656; 435/69, 435/223, 267

[56] References Cited

U.S. PATENT DOCUMENTS

| Re. 30,669 | 7/1981 | Feldman | 435/223 X |
| 3,591,388 | 7/1971 | Moelker et al. | 435/223 X |
| 4,431,629 | 2/1984 | Olsen et al. | 426/46 |
| 4,443,540 | 4/1984 | Chervan et al. | 426/46 X |

FOREIGN PATENT DOCUMENTS

| 688549 | 6/1964 | Canada | 435/223 |
| 1035897 | 7/1966 | United Kingdom | 435/223 |

*Primary Examiner*—Robert Yoncoskie
*Attorney, Agent, or Firm*—Fidelman, Wolffe & Waldron

[57] ABSTRACT

Enzymatic hydrolysis of soy protein with microbial rennet to DH 0.25-2.5% to produce an egg white substitute. The soluble hydrolysate produced by treatment with *Mucor miehei* proteinase exhibits superior organoleptic properties.

5 Claims, 6 Drawing Figures

Chromatogram showing *Mucor miehei* proteinase modified soy protein analyzed on reversed-phase chromatography.

Chromatogram showing destabilized *Mucor miehei* proteinase modified soy protein analyzed on reversed-phase chromatography.

Chromatogram showing *Mucor pusillis* proteinase modified soy protein analyzed on a reversed-phase chromatography.

Chromatogram showing Pepsin modified soy protein analyzed on a reversed-phase chromatography.

Sodium Dodecl Sulfate Polyacrylamide Gel Electrophoresis Patterns
A. Molecular Weight Standards
B. Control Soy Isolate
Hydrolysates Produced Using:
C. *Mucor miehei* Proteinase (MMSI)
D. Destabilized *Mucor miehei* Proteinase
E. *Mucor pusillis* Proteinase
F. Calf Rennet
G. Pepsin

ENZYME MODIFIED SOY PROTEIN FOR USE AS AN EGG WHITE SUBSTITUTE

INTRODUCTION

This invention relates to an enzymatically modified soy isolate, and, in particular, to preparation of an egg white substitute from the soy protein by treatment with a microbial rennet, preferably with the proteinase of *Mucor miehei*.

BACKGROUND OF THE INVENTION

An egg white substitute material which, briefly, is a protein derivative exhibiting whipping or emulsifying properties can be produced by treatment of a soy protein substrate with a proteolytic enzyme. The substitute egg white material can be used in a wide variety of nutritional materials and confectionaries, such as mousse.

The thrust of the art has been to convert soy protein into an egg white substitute of ever greater palatability and with ever more nearly the properties of egg white. Thus, a protein derivative, which is an enzyme hydrolyzed soy isolate, is described in "Functionality and Protein Structure", ACS Symposium 92, 1979, pp. 125-146 (J. Adler-Nissen and H. Sejr Olsen, "The Influence of Peptide Chain Length on Taste and Functional Properties of Enzymatically Modified Soy Protein"), from which it appears that a series of hydrolysates of acid precipitated soy protein have been prepared using different enzymes and different DH-values (DH is an abbreviation for degree of hydrolysis, defined hereinafter), from which it was discovered that both the whipping and emulsifying properties of these soy protein hydrolysates had an optimum in a certain DH interval. The whipping and/or emulsifying ability of these soy protein hydrolysate is good, but open to improvement.

Also, soy protein derivates with excellent whipping properties are known, but they do not have a sufficiently high nutritional value, and may even be bitter, which characteristically limits their application in food formulations. See, for example, *J. Am. Oil Chemists' Soc.*, March 1979, Vol. 56, pp 345-349.

Workers in the art have suggested ways to alleviate some of the often present undesired properties in soy isolate hydrolysate. Thus, Adler-Nissen U.S. Pat. No. 4,100,024 teaches that bitterness can be avoided by a controlled hydrolysis of soy isolate with a microbial alkaline proteinase. Olsen U.S. Pat. No. 4,431,629, teaches that controlled hydrolysis of the soy protein coupled with removal of low molecular weight peptides from the hydrolysate by ultrafiltration produces a superior egg white substitute material from the soy protein, a material which exhibits excellent whipping and/or emulsifying ability and good nutritional value combined with absence of bitterness.

The inventors hereof believe that the egg white substitute material made by practice of this invention constitutes an improvement over the products made according to the aforementioned Olsen U.S. Pat. No. 4,431,629.

RATIONALE OF THE INVENTION

Heretofore, workers in the art seem to have assumed that most, if not all, proteinases are reasonably equivalent insofar as concerns their hydrolytic action on soy protein. For example, the Sawada U.S. Pat. No. 4,015,019 suggests pepsin as the preferred enzyme for soy protein, but contemplates also many other proteinases, notably papain, acid protease, neutral protease. Pour-El et al. U.S. Pat. No. 3,932,672 suggests preparation of an egg white substitute material through treatment of the protein with ficin, bromelain, pepsin, trypsin or papain. Although the process of Adler-Nissen U.S. Pat. No. 4,100,024 is keyed to microbial alkaline proteinase, and the process of the aforementioned Olsen U.S. Pat. No. 4,431,629 employs only alkaline or neutral proteinase, their rationale for soy protein hydrolysis is much the same as was taken by the earlier workers in the art. The proteinase exemplified in the Adler-Nissen and Olsen patents are non-specific or non-selective as to substrate and cleavage sites, being the general purpose proteinases that suggest themselves for any proteolytic action to a high DH, for totality of action so to speak.

The inventors hereof adopted the premise that differences, enzyme to enzyme, in their hydrolytic action on the soy substrate may become a principal basis for further improvement in the egg white substitute product. With a proteinase capable only of rather selective activity, more of the most desirable cleavages in the soy protein chain may result and, undesired cleavages in the peptides may be reduced, or even eliminated. Studies by the inventors hereof support this rationale for achieving desirable degrees or types of hydrolytic cleavage in the soy protein molecules. Surprisingly, treatment with microbial rennets resulted in soy hydrolysates exhibiting superior product qualities. Treatment with the proteinase from *Mucor miehei* have produced the best results.

BRIEF STATEMENT OF THE INVENTION

In brief, the present invention involves hydrolyzing soy protein with a microbial rennet, preferably with the proteinase elaborated by *Mucor miehei*.

The resulting protein hydrolysate constitutes a superior egg white substitute, and/or a superior extender for imitation cheese.

DISCUSSION OF THE INVENTION

The proteinase elaborated by *Mucor miehei* constitutes a widely employed microbial rennet. For details about this enzyme, reference is made of U.S. Pat. No. 3,988,207 of K. Aunstrup. The proteolytic action of this enzyme is rapid on some protein forms, and is slow or non-existent for other protein forms. On the whole, workers in the art consider the *Mucor miehei* proteinase a rather poor proteinase for general purposes vis a vis the neutral or alkaline proteinase from bacilli. In a word, the selectivity desired for practice of this invention is present. Much the same desirable selectivity has been found with other microbial rennets notably with the proteinase from *Mucor pusillus*. The other comparable proteinases tested by the inventors hereof, calf rennet and pepsin for example, also hydrolyzed soy protein selectively, but the resulting hydrolysate exhibited properties believed to be less desirable.

As might be expected, treatment of soy isolate with microbial rennet causes a somewhat limited hydrolysis of the soy isolate; a lesser fraction thereof being made completely soluble than can be solubilized by treatment with alkaline proteinase. To achieve high yields of protein hydrolysate from the soy isolate a subsequent treatment of the protein fraction not solubilized by the microbial rennet using a more general purpose proteinase may be carrier out, and such a subsequent treatment with alkaline proteinase is contemplated in practice of this invention, as an optional mode thereof.

The fraction of soy isolate made soluble by treatment with a microbial rennet exhibited improved whipping expansion and foam stability and superior organoleptic properties. The total hydrolysate reaction product, namely solubilized and insoluble fractions in admixture, also exhibited improved whipping expansion and foam stability. However, the organoleptic properties of the soluble fraction alone were significantly the superior.

Compared analytically to the soluble fractions obtained from soy isolate by treatment with the *Mucor miehei* proteinase (MMSI) and the *Mucor pusillus* proteinase were: the soluble fraction in the soy isolate hydrolysate treated with the *Bacillus licheniformis* proteinase according to practice of Adler-Nissen U.S. Pat. No. 4,100,024, the commercial material "Gunther's" whippable protein (Staley), the hydrolysates obtained by treatment with pepsin and with calf rennet. Significant composition differences were found soy hydrolysate to soy hydrolysate.

For example, the MMSI product contains more hydrophilic polypeptides than "Gunther's" whippable protein and exhibited greater foam stability. Moreover, the MMSI soluble hydrolysate products contained a polypeptide distribution pattern including a polypeptide of about 29,500 MW. This peptide was not found in unmodified soy isolate, nor in hydrolysates resulting from treatment with calf rennet, or Alcalase ™ (data not shown). This peptide is not present in Gunther's whippable protein. A 30,000 MW peptide was found in the pepsin treatment hydrolysate. In some tests, the MMSI product exhibited thermoplastic properties which the other soy hydrolysates did not. Measurable chemical and functional differences were found also between MMSI and the soy isolates modified by the other rennets. The chemical composition differences between hydrolysates made by treatment with the various rennets appear to be somewhat less pronounced than the functional differences found, rennet to rennet hydrolysate.

An informal taste panel favorably evaluated strawberry and chocolate mousse made from the MMSI product. All the other soy isolate hydrolysates tested by the panel were considered inferior on the basis of flavor, texture, foam stability, or color.

PRACTICE OF THE INVENTION

Figure 2A:
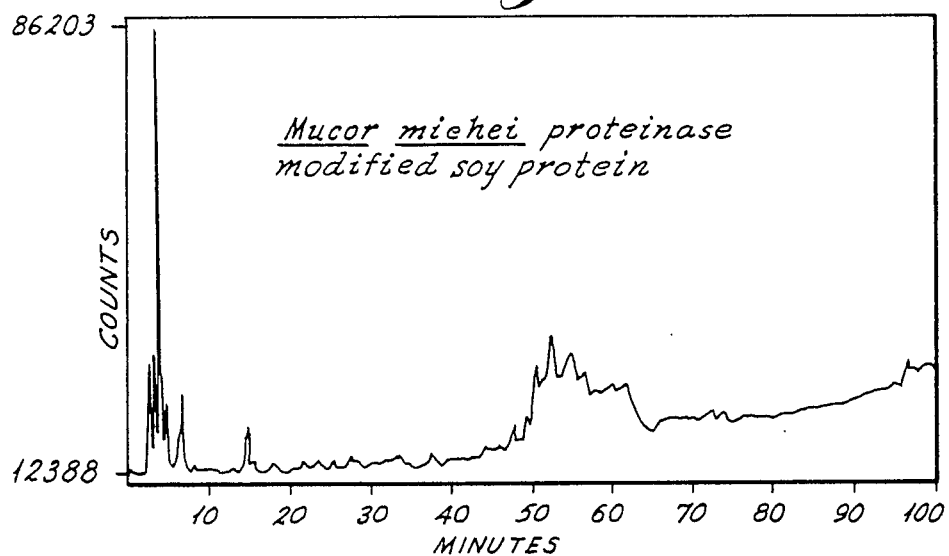

Practice of this invention can best be understood with reference to the attached drawing whereon:

FIG. 1 is a flow sheet for the process of this invention including thereon ways to dispose of the considerable fraction of the soy isolate not solubilized by treatment with the microbial rennet. Preferred mode treatment conditions have been legended in the flow sheet;

FIGS. 2a, b, c, and d are HPLC Chromatograms of the soluble fraction from soy protein isolates treated, respectively, with *Mucor miehei* proteinase, thermally destabilized *Mucor miehei* proteinase, *Mucor pusillus* proteinase, and pepsin.

Figure 3:
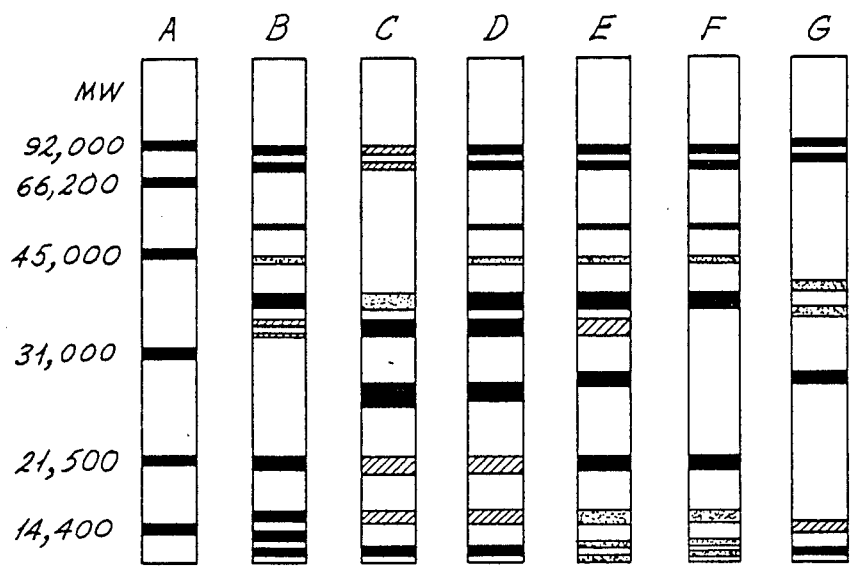

FIG. 3 shows the electrophoresis patterns of soluble fractions from soy protein isolates treated with various proteinases.

The term "soy protein" as used herein in intended to refer to any form of concentrated soy protein which may, for example, be a purchased soy protein concentrate or, of course, a soy isolate made expressly for practice of this invention (in an installation that converts defatted soy meal into concentrated soy protein). The protein concentration values provided hereinafter were calculated from the percentage of nitrogen measured according to Kjeldahl multiplied by 6.25.

The treatment with microbial rennet is carried out at a temperature in the range of 25° C.–50° C., pH 3.0–6.5 with a proteinase concentration that corresponds to an activity of about 0.5–10 KRU/gm, preferably 1–4 KRU/gm of soy protein to treat an aqueous suspension containing a substrate concentration between 5 and 20% w/w soy protein, preferably between 8–15% w/w soy protein. Thereafter, the enzyme is inactivated by heating either the reaction mixture, or, less preferably, by heating the hydrolysate solution after removal of the insolubles.

Hydrolysis is carried out until a degree of hydrolysis (DH) in the range of from 0.25–2.5% is attained.

The degree of hydrolysis (DH) is defined by the equation:

$$DH = \frac{\text{Number of peptide bonds cleaved}}{\text{Total Number of peptide bonds}} \times 100\%$$

Reference is made to J. Adler-Nissen, *J. Agr. Food Chem.* 24(6):1090; 1976 for a more detailed discussion of the degree of hydrolysis (DH).

The number of the peptide bonds cleaved can be measured by means of the ninhydrin method. The ninhydrin method is described in Moore, S. and Stein, W. H. "Photometric Ninhydrin Method for use in the Chromatography of Amino Acids", *J. Biol. Chem.*, 176, 367–388 (1948) to which reference is made. Measurement can be made by the trinitrobenzenesulfonic acid method as is described in J. Adler-Nissen's *Agricultural and Food Chemistry* 27(6): 1256–1267. This is the Trinitrobenzenesulfonic Acid (TW65) method, to which reference is made.

The given range for protein and enzyme proportions provides at the minimum, sufficient enzyme to avoid too low a hydrolysis rate, and, at the maximum still avoids excessive enzyme usage and cost. Hydrolysis is carried out on the relatively flat upper part of the Michaelis-Menten plot for the microbial rennet with soy protein.

As may be expected, enzymatic hydrolysis of the soy isolate is halted, e.g. by heating the reaction mixture, before the bitter tasting low molecular weight polypeptides appear in the hydrolysate. Since the microbial rennet is relatively heat stable, special attention should be paid to attaining complete thermal deactivation of the enzyme. It is noted therefore that a thermally destabilized form of the *Mucor miehei* proteinase is commercially available. However soy hydrolysate produced by treatment with this form of the microbial rennet is not completely the same as hydrolysate made with unmodified microbial rennet; the properties are not as superior. Unmodified *Mucor miehei* proteinase is the preferred enzyme for practice of this invention.

If desired, conduct of the hydrolysis reaction may be pH controlled with a pH-stat and may be conducted to a predetermined DH level all as suggested by the aforementioned Adler-Nissen U.S. Pat. No. 4,100,024. With microbial rennets immediate quenching of the reaction when the desired DH has been attained has not been found necessary. However, removal of low molecular weight peptides from the soy hydrolysate solution by ultrafiltration, as is suggested by the aforementioned Olsen U.S. Pat. No. 4,431,629, may be carried out and is contemplated.

As compared to many prior art suggestions for proteolytic hydrolysis of soy protein, the DH of 0.25–2.5% contemplated for practice of this invention is relatively low, and a relatively low yield of solubilized hydrolysate is expected. Low DH and yield go together, as is known to the art. Adler-Nissen U.S. Pat. No. 4,100,024 points out that with alkaline proteinase limiting DH to roughly 10% leaves about 40% of the soy protein still insoluble. Hydrolyzing to not more than DH 2.5% with microbial rennets, namely hydrolysis with proteinases noteworthy heretofore only for milk coagulating capability, could be expected to solubilize relatively little soy protein. It is believed to be surprising therefore that more than 30% of the soy protein may be solubilized by treatment with *Mucor miehei* proteinase.

Since an uncertain level of interdependence appears to exist in the effect of controllable parameters e.g., enzyme and substrate concentration, reaction pH, DH, on yield and best product properties, cut and try testing may be advisable to establish optimum parameters for plant practice of this invention. The preferred mode conditions for practice of this invention herein exemplified were drawn from results of bench scale and small pilot level test studies, and, therefore, the details thereof may not be optimum for practice of this invention on larger scale.

Reverting now to FIG. 1 of the attached drawing whereon is illustrated the flow sheet and details for preferred practice of this invention, it is noted that practice of this invention may include as an option commencing with soy meal and conversion of (defatted) soy meal into the soy isolate to be treated with microbial rennet. Doing so allows return of the high proportion of the soy protein that has not been insolubilized to the isolate production facility for incorporation into soy isolate products made therein for purposes other than practice of this invention.

In any event, soy isolate is hydrolyzed with the microbial rennet employing, for example, 2 KRU/gm of soy protein, at 50° C., at pH 6.5 to a DH of about 1%, whereafter the enzyme in the reaction mixture is deactivated by heating to 80° C. Typically, 30–35% of the soy isolate is solubilized. Then the insolubles are removed from the reaction mixture, e.g., by settling or centrifugation, generating thereby the soluble fraction (MMSI). Optionally, the hydrolysate solution is ultrafiltered. The MMSI solution is pH adjusted to pH 6.5 then (spray) dried to generate a solid (powder) product.

Shown on the flow sheet are the optional features contemplated for practice of this invention for instances when solubilization of greater proportions of the soy protein is desired.

A preferred way for increasing yield is to treat the insoluble fraction with an alkaline proteinase according to the practice of the aforementioned Adler-Nissen U.S. Pat. No. 4,100,024 generating thereby additional soluble soy protein hydrolysate, some or all of which is added to the hydrolysate product made by treatment with microbial rennet. Desirably, the liquid phase MMSI and ISSPH products are mixed, then pH adjusted, and dried. Equal proportions on a dry weight basis of MMSI and ISSPH fractions may be present in the mixed hydrolysate product.

Mention has already been made that the preferred microbial rennet is the *Mucor miehei* proteinase (unmodified for reduction in thermal stability). This enzyme is more effective in hydrolyzing soy isolate than calf rennet or the *Mucor pusillus* proteinase (or the thermally destabilized *Mucor miehei* proteinase for that matter). The *Mucor miehei* proteinase required lower dosage and less time to hydrolyze soy isolate to the DH 0.5% level employed for the comparative study hereinafter described.

PRODUCTS

The extent to which each proteinase enzyme produces a unique soluble soy hydrolysate may be seen in FIGS. 2 and 3. The 29,500 MW polypeptide results from treatment with the *Mucor miehei* proteinases. Treatment with the *Mucor pusillus* proteinase and pepsin produce a 30,000 MW polypeptide, but treatment with calf rennet produces no polypeptide of MW between 21,500 and 39,500. Soy isolate contains peptide fractions of about 41,000 MW and 48,000 MW that are not present in the hydrolysate made with unmodified *Mucor miehei* proteinase, but which can be found in hydrolysates made with thermally destabilized *Mucor miehei* proteinase, *Mucor pusillus* proteinase and calf rennet. Treatment with pepsin removes a polypeptide of about 22,200 from soy isolate, but such a polypeptide is present in the hydrolysates made with all of the rennets.

On FIG. 3, light shading has been provided to indicate the components present in relatively low proportions. Thus, FIG. 3 shows that the soy isolate components indicated by: the two bands between 66,200 and 92,000 m.w.; the band at about 35,000 m.w.; and the band at 21,500 m.w., are all diminished by the treatment with *Mucor miehei* proteinase to DH 0.5%. When the treatment is carried out to DH 1.2% these components disappear altogether. However, the component indicated by the band at 15,000 m.w., also diminished by treatment to DH 0.5%, is still present after treatment to DH 1.2%.

Soluble soy hydrolysates made with all of the microbial rennets exhibit properties overall that are believed to be superior vis a vis the prior art egg white substitutes. The MMSI product made with (unmodified) *Mucor miehei* proteinase is believed to be best, and is preferred. This MMSI product is completely water soluble above pH 6 and below pH 3. Minimum solubility of about 79% is at about pH 4. Mention has already been made that this product exhibits good whipping expansion and foam stability properties, as well as good organoleptic properties.

For further understanding of this invention the following examples of practice thereof are presented.

EXAMPLE 1

MMSI

Eighty grams of soy isolate (Edi-Pro A brand from Ralston Purina Co.) were combined with water to make up to one liter and 5N NaOH added to adjust the pH to 6.5. In addition, $CaCl_2$ was added to give a concentration of 10 g/100 l. The reaction mixture was heated to 50° C. After the temperature reached 50° C., proteinase from *M. miehei* (4% of protein) was added. Dosage was 2 KRU/gm of soy isolate.

During hydrolysis pH was kept constant at 6.5 by the addition of 0.05N NaOH. The degree of hydrolysis was calculated on the basis of the consumption of base by means of the relationship according to J. Adler-Nissen (*J. Agric. Food Chem.* 24(6):1090; 1976).

At DH=1.2%, the hydrolysis was terminated by heating the reaction mixture to 80° C. for 10 min. The reaction mixture hydrolysate was centrifuged and the supernatant was designated as "MMSI-Soluble Fraction".

Separate portions of MMSI—whole hydrolysate and MMSI-S.F. (soluble fraction) made as described above were dried and analyzed for food functionalities. The desirable functional and organoleptic properties already commented upon herein were found to exist.

EXAMPLE 2

A comparative study was conducted as follows:

Enzymes

Enzymes used for the study are listed in the following Table.

TABLE I

| Enzymes | Specific Activity KRU/g | Dose % E/S |
|---|---|---|
| a. Mucor miehei Proteinase | 53.09 | 4 |
| b. Destabilized Mucor miehei Proteinase | 49.13 | 4 |
| c. Calf Rennet | 17.15 | 8 |
| d. Mucor pussillis Proteinase | 55.26 | 4 |
| e. Pepsin | 3160 Pepsin U/mg Protein | 0.25 |

Substrate

Soy protein isolate, Edi-Pro A brand (Ralston Purina Co.). The substrate concentration of soy isolate, was 8%. The protein concentration of the Edi-Pro A was 93.4%.

Hydrolysis Parameters and Samples Preparation

Soy isolate was incubated with each enzyme (except pepsin) at pH 6.5 at an E/S (Enzyme/Substrate) shown in Table I. In most cases the hydrolysis temperature was at 50° C.

Hydrolysis with the thermally destabilized *Mucor miehei* proteinase was carried out at 30° C., because it is not stable at 50° C.

Since pepsin is not active at pH 6.5 and 50° C., the hydrolysis was carried out at pH 2 and 40° C. The enzyme level used was at 0.25% E/S. After hydrolysis, the reaction mix was adjusted back to pH 6.5 with NaOH.

When hydrolysis reached a DH of 0.5%, the reactions were inactivated by heating at 80° C. for 10 min. The hydrolysates were centrifuged at 10,000×g for 20 min. The supernatants (soluble fractions) were decanted and freeze dried. These soluble fractions were used for whipping tests, HPLC, and SDS polyacrilamide gel electrophoresis analyses.

Analysis and Test Results

A. Methods Used to Monitor Proteolytic Reactions

Osmometry and pH-Stat were used to monitor proteolytic reactions. The pH-Stat method was conducted according to procedures described in "Functionality and Protein Structure", ACS Symposium 92, 1979, pp. 125-146 (J. Adler-Nissen and H. Sejr Olsen, "The Influence of Peptide Chain Length on Taste and Functional Properties of Enzymatically Modified Soy Protein"). The NaOH solution used was 0.05N.

For osmometry, aliquots (2 ml) of samples were measured immediately for their osmolality using an osmometer. Net osmometer readings were obtained by substracting the initial, zero time, readings from later ones. These values are related back to % DH using a standard curve.

Hydrolysis conditions and the times required for each enzyme to reach DH 0.5% is tabulated below.

TABLE II

| Enzymes | Conditions | Approximate time required to reach 0.5% DH (hrs.) |
|---|---|---|
| Mucor-miehei Proteinase | pH 6.5, 50° C. 8% S, 4% E/S | 2 |
| Destabilized Mucor miehei Proteinase | pH 6.5, 30° C. 8% S, 4% E/S Redose 4% E/S after 3 hrs. | 4 |
| Mucor pusillis Proteinase | pH 6.5, 50° C. 8% S, 8% E/S | 3 |
| Calf Rennet | pH 6.5, 50° C. 8% S, 8% E/S | 4 |
| Pepsin | pH 2.0, 40° C. 8% S, 0.25% E/S | 0.42 |

B. Foam Expansion Tests

Foam expansion tests were performed according to the method of Knuckles and Kohler (1983), *J. Agric. Food Chem.* 30:748.

The whipping conditions were 2.5% protein in 0.01M potassium phosphate buffer at pH 5.0. The protein solutions were immediately whipped in a Sorvall Omni-Mixer at 5,000 RPM for 3 min. The foams were transferred to a 250 ml graduated cylinder and the initial volume recorded. Percent Volume Increase was calculated using the formula below.

$$\% \text{ Vol. Incr.} = \frac{\text{Final Vol.} - \text{Initial Vol.}}{\text{Initial Vol.}} \times 100\%$$

Foam stability was reported as the % volume increase remaining at the time of the measurement (20–30 min. intervals over 4 hours).

The foam expansion results are tabulated below.

TABLE III

| Soy Isolate Hydrolysate Made With | % Volume Initial Increase | % Volume After 4 Hours |
|---|---|---|
| Control (no enzyme) | 75 | 66 |
| Mucor miehei Proteinase | 206 | 206 |
| Destabilized Mucor miehei Proteinase | 150 | 146 |
| Mucor pusillis Proteinase | 150 | 146 |
| Calf Rennet | 83 | 80 |
| Pepsin | 306 | 296 |

A 1% DH MMSI hydrolysate, a more preferred MMSI product of this invention, was tested against Gunther's whippable protein. It exhibited about equal foam expansion but had greater foam stability than the commercial product, which is believed to be made using pepsin.

HPLC Reversed-Phase Chromatography (RPC)

Samples were dissolved in 0.2M potassium phosphate buffer, pH 7.5. The samples were filtered through a 0.45 u (micron) Millipore filter before RPC analysis.

Figure 2B:
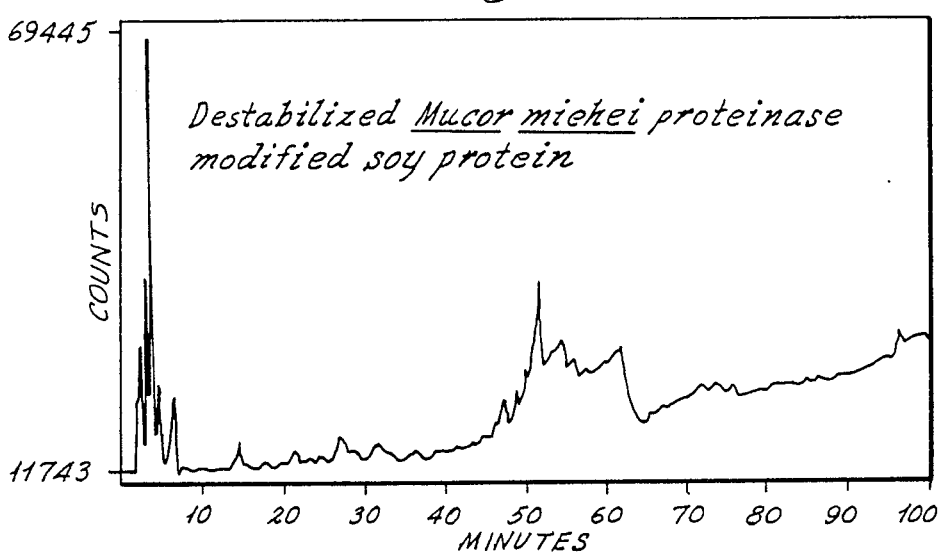
Figure 2C:
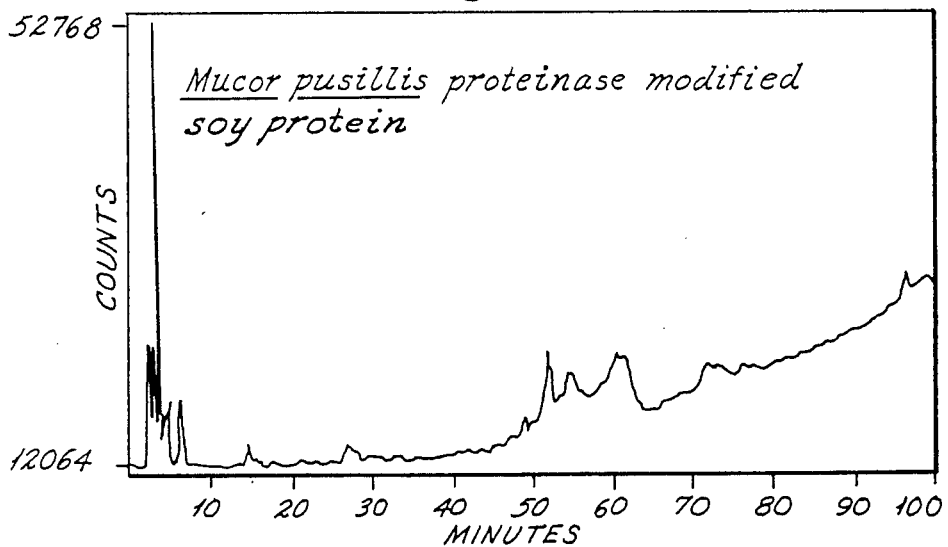
Figure 2D:
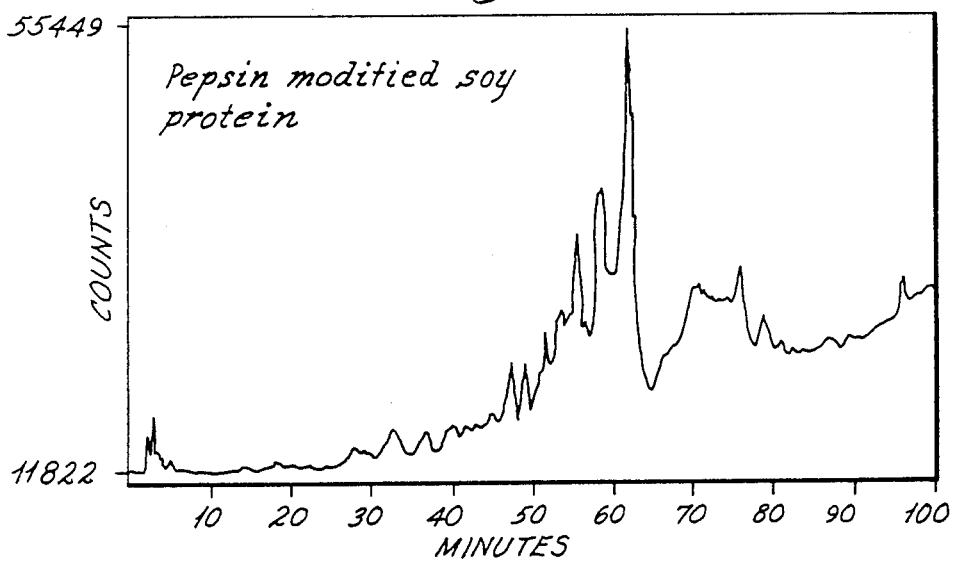

The RPC chromatograms, which are posed as FIG. 2 herein, show that soy isolate modified by Mucor enzymes are chemically similar (FIGS. 2a, 2b and 2c). However, MMSI-S.F. possesses more hydrophilic peaks than soy isolate modified by pepsin (FIG. 2d).

Sodium Dodecyl Sulfate Polyacrylamide Gel Electrophoresis (SDS-PAGE)

Protein samples were analyzed by SDS-PAGE according to Weber and Osborn (1969), *J. Biol. Chem.* 244 (16):4406. Slab gels with 15% polyacrylamide were used.

The results are posed as FIG. 3 herein.

MMSI-S.F. is chemically different from the soy isolates modified by the other enzymes (see FIG. 3). MMSI lacks the polypeptides at 41,000 and 48,000 MW which are present in proteins modified by the other renneting enzymes. In addition, calf rennet modified soy isolate enzymes. In addition, calf rennet modified soy isolate does not possess the polypeptide at 29,500 MW that the Mucor modified soy isolates have. Further, pepsin modified soy isolate is different from MMSI because it lacks the polypeptide at 22,200 MW.

Solubility

Five grams of each MMSI-S.F. was added to separate quantities of water at 100 ml each (5% w/v solution) and stirred for 5 min. The pH of each solution was adjusted to various points in a pH range 2-10. After stirring for 15 min., the solutions were centrifuged at 3,000×g for 10 min. Two grams of the supernatant were dried in an oven at 130° C. for 1 hour.

Percent solubility was calculated using the formula below.

$$\% \text{ Solubility} = \frac{\text{Wt. of Solids in Supernatant}}{\text{Total Wt. of solids}} \times 100$$

MMSI-S.F. solubilizes completely in water above pH 6 and below pH 3. In addition, the solubility curve shows minimum solubility between pH 3-6. The least solubility value is 79%, such being at about pH 4.

The test study described above shows that MMSI is a unique protein form chemically and functionally different from the soy hydrolysates made by treatment with other proteinases.

We claim:

1. A process for enzymatically modifying soy protein which comprises hydrolyzing to a degree of hydrolysis in the range of 0.25-2.5 an aqueous suspension of a concentrated soy protein with a *Mucor meihei* or *Mucor pusillus* microbial rennet in concentration ranging from 0.5 to 10 KRU per gm of soy protein at a substrate concentration of between 5 and 20% w/w soy protein at pH 3-6.5, then deactivating the enzyme and thereafter recovering the enzyme modified soy protein from the suspension.

2. The process of claim 1 further comprising hydrolyzing in the range of 25° C.-50° C.

3. The process of claim 1 further comprising separating the residual insoluble soy protein from the supernatent of the suspension and recovering the enzyme modified soy protein from the supernatant, treating the residual insoluble soy protein with an alkaline protease and admixing the soy protein solubilized thereby with the aforementioned microbial rennet modified soluble soy protein.

4. The process of claim 1 which further comprises hydrolyzing with the *Mucor miehei* proteinase and recovering a soluble *Mucor miehei* modified soy protein fraction from the aqueous suspension reaction mixture.

5. The enzyme modified soy protein made according to the process of claim 4.

* * * * *